United States Patent
Okamoto et al.

(10) Patent No.: US 7,864,376 B2
(45) Date of Patent: Jan. 4, 2011

(54) IMAGE PROCESSING APPARATUS

(75) Inventors: Yuji Okamoto, Souraku-gun (JP);
Katsuyoshi Fujiwara, Sennan-gun (JP);
Naofumi Ueda, Souraku-gun (JP);
Syouichirou Yoshiura, Ikoma-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 841 days.

(21) Appl. No.: 11/234,583

(22) Filed: Sep. 22, 2005

(65) Prior Publication Data
US 2006/0061820 A1    Mar. 23, 2006

(30) Foreign Application Priority Data
Sep. 22, 2004   (JP)   ............... 2004-276233

(51) Int. Cl.
*H04N 1/00* (2006.01)
*G06K 15/00* (2006.01)
*G06F 3/12* (2006.01)

(52) U.S. Cl. .................. 358/403; 358/1.14; 358/1.15; 358/1.16

(58) Field of Classification Search ............... 358/1.14, 358/1.15, 1.9, 402, 403, 405, 407, 426.05, 358/444, 524; 709/226
See application file for complete search history.

(56) References Cited

U.S. PATENT DOCUMENTS 6,498,837 B1   12/2002   Baba 6,704,119 B1 *  3/2004   Suzuki et al. ............... 358/1.16
2002/0059317 A1 * 5/2002   Black et al. .................. 707/200

FOREIGN PATENT DOCUMENTS

| JP | 01-256068 | 10/1989 |
|---|---|---|
| JP | 06-178041 | 6/1994 |
| JP | 07-028365 | 1/1995 |
| JP | 09-223061 | 8/1997 |
| JP | 11-184756 | 7/1999 |
| JP | 11-272594 | 10/1999 |
| JP | 2000-36885 | 2/2000 |
| JP | 2004-007814 | 1/2004 |
| JP | 2004-102549 | 4/2004 |
| JP | 2004-178249 | 6/2004 |
| JP | 2004-229239 | 8/2004 |

* cited by examiner

*Primary Examiner*—James A Thompson
(74) *Attorney, Agent, or Firm*—Edwards Angell Palmer & Dodge LLP; David G. Conlin; Steven M. Jensen

(57) ABSTRACT

When an image processing apparatus receives an execution instruction for image processing, it performs management of information related to image processing and image data that is subjected to image processing, as historical data. When the execution instruction for the image processing is received from a user, the image processing apparatus stores image data read from a document or image data received from outside, and then stores process information related to the image processing based on the received execution instruction and the stored image data, as historical data. The image processing apparatus then performs image processing of the image data that is stored in accordance with the received execution instruction.

6 Claims, 10 Drawing Sheets

FIG. 2A

```
MANAGER AUTHENTICATION SCREEN

INPUT AUTHENTICATION DATA
            [ 1 1 1 1 ]

[AUTHENTICATE]    [END]
```

FIG. 2B

```
MANAGER OPERATION SCREEN

SELECT OPERATION
    [ START MANAGEMENT OF HISTORICAL DATA ]
    [ END MANAGEMENT OF HISTORICAL DATA ]
    [ CHECK HISTORICAL DATA ]
    [ DELETE HISTORICAL DATA ]        [END]
```

FIG. 2C

```
MANAGEMENT CONDITION SETTING SCREEN

SELECT TYPE OF PROCESS FOR WHICH
    HISTORICAL DATA IS TO BE MANAGED
            [ COPY ]    [ PRINTER ]
            [ FAX ]
                              [SET]  [END]
```

FIG. 3A

HISTORICAL-DATA DISPLAY SCREEN

SELECT DISPLAY METHOD FOR
PROCESS INFORMATION

| ORDER OF DATE AND TIME |
| ACCORDING TO TYPE OF PROCESS |   [END]

FIG. 3B

HISTORICAL-DATA DISPLAY SCREEN

SELECT TYPE OF PROCESS

[COPY]   [PRINTER]
[FAX]                [END]

FIG. 3C

LIST OF PROCESS INFORMATION

DATE/TIME         PROCESS         CONTENTS
2004/8/1/10:00  TRANSMISSION   2 SHEETS FAX3
2004/8/1/11:00  TRANSMISSION   3 SHEETS FAX3
2004/8/1/11:10  RECEPTION      2 SHEETS FAX5
2004/8/1/11:30  TRANSMISSION  10 SHEETS FAX5
2004/8/1/12:00  RECEPTION      5 SHEETS FAX3

[OK]  [END]

FIG. 3D

[PRINT]  [END]

2004/8/1/11:00 TRANSMISSION  3 SHEETS FAX3

FAX TRANSMISSION SHEET

AAA Co., Ltd.

Mr. XXXXX

FIG. 4A

HISTORICAL-DATA DELETION SCREEN

SELECT DELETION METHOD FOR HISTORICAL DATA

| DELETION OF ENTIRE HISTORICAL DATA |
| DELETION ACCORDING TO TYPE OF PROCESS |
| DELETION ACCORDING TO DATE AND TIME |

END

FIG. 4B

HISTORICAL-DATA DELETION SCREEN

ENTIRE HISTORICAL DATA IS DELETED. ALL RIGHT ?

DELETE    END

FIG. 4C

HISTORICAL-DATA DELETION SCREEN

SELECT TYPE OF PROCESS

COPY    PRINTER

FAX    DELETE    END

FIG. 4D

HISTORICAL-DATA DELETION SCREEN

INPUT DATE WHEN HISTORICAL DATA IS DELETED

1 . 1 . 2003
31 . 12 . 2003

DELETE    END

IMAGE PROCESSING APPARATUS

CROSS-REFERENCE TO RELATED APPLICATIONS

This Nonprovisional application claims priority under 35 U.S.C. §119(a) on Patent Application No. 2004-276233 filed in Japan on Sep. 22, 2004, the entire contents of which are hereby incorporated by reference.

BACKGROUND OF THE INVENTION

The present invention relates to an image processing apparatus that performs management of data subjected to image processing and information related to image processing of that data together as historical information.

So far, a digital multi-functional machine that is equipped with a plurality of functions such as a copy function, a facsimile function, a transmission function, and a printer function has been put into commercial production as an image processing apparatus. In the copy function, an image that is recorded on a document is scanned and fetched as image data, and an image is formed on a paper sheet based on the image data fetched, and outputted. In the facsimile function, the image data is transmitted between the image processing apparatus and an external facsimile apparatus by facsimile communication. In the transmission function the image data fetched is transmitted to an external apparatus. In the printer function, image data that is transmitted from the external apparatus is received and output on the paper sheet. In particular, the digital copier in recent years is equipped with a storage unit such as a hard disc to store the image data and is structured such that processes of all functions are performed in tandem.

A new function is added to the digital copier mentioned above. According to this new function, the image data that is fetched and data such as that acquired from the external apparatus are stored in a storage unit. The data stored is output as an image recorded on a paper sheet according to the requirement. Or, transmission of this data to an apparatus such as a personal computer that is externally connected is enabled. Thus, the digital copier can be used as a server device for the image data. This function has been realized.

As an example of this, an image-data output controlling apparatus that is provided with an electronic filing function has been disclosed in Japanese Patent Application Laid-open No. 6-178041 (1994). According to this disclosure, image data that is fetched by using a scanner or image data that is received by facsimile communication is stored. An instruction is given to read the image data according to the requirement and to output the image. By using such an image processing apparatus, the image data that has already been used can be reused and a user can output smoothly documents or images whenever required.

On the other hand, the image data that is handled by the image processing apparatus includes confidential image data that contains confidential documents such as trade secrets. When unlimited storage and output of the image data in the image processing apparatus is made possible, it gives rise to problems regarding security such as leakage of information or misuse of information. To cope with this problem, a copier that performs personal authentication and allows the use only to users who have registered beforehand, has been disclosed in Japanese Patent Application Laid-open No. 7-28365 (1995).

Furthermore, as a security measure for the image data stored by the image processing apparatus, a technology in which the image data is stored in a storage unit upon encoding, has been disclosed in Japanese Patent Application Laid-open No. 1-256068(1989). Moreover, a technology to delete the image data that is stored, from the storage unit as the image data becomes unnecessary has been disclosed in Japanese Patent Application Laid-open No. 9-223061 (1997). Thus, by the encoding of the image data by the image processing apparatus, the misuse of the image data that is fetched from the image processing apparatus becomes difficult and by deletion of the image data by the image processing apparatus, the image data cannot be fetched from the image processing apparatus, which in turn, improves the security of the image processing apparatus.

However, in the electronic filing function that stores the image data in the storage unit, by performing a process of storing upon encoding the image data or a process of deleting the image data that has become unnecessary, although the security of the image processing apparatus can be improved, it is not possible to keep track of as to how the image data that is stored has been used. Thus, even if the image data has been used illicitly, it is not possible to keep track of it, which is a problem.

BRIEF SUMMARY OF THE INVENTION

The present invention has been made in view of such problems and it is an object of the present invention to provide an image processing apparatus that is capable of performing management of historical information of each data by storing the data that is received for image processing as historical information together with information related to image processing.

Another objective of the present invention is to provide an image processing apparatus that is capable of preventing misuse and unauthorized editing of the historical information of each data by storing the historical information of each data in a history storage unit, to which an access is restricted.

The image processing apparatus according to the present invention that includes a data storage unit that stores received data, an instruction receiving unit that receives an execution instruction for the image processing based on the stored data, a processing unit that performs an image processing based on the data stored in the data storage unit, according to the execution instruction received by the instruction receiving unit, comprises a history storage unit that stores, as historical information, the data that is stored in the data storage unit and information related to the image processing based on the data for which the instruction receiving unit has received the execution instruction, and a restricting unit that restricts an access to the history storage unit.

According to the present invention, the data that is received is stored in the data storage unit. When the execution instruction is received based on the stored data, the image processing apparatus that performs the image processing based on the data stored in the data storage unit in accordance with the received execution instruction, stores the received data and the information related to the image processing based on the received data as the historical information in the history storage unit, the access to which is restricted. Therefore, it is possible to perform the management of each data together with the information related to the image processing based on each data, as the historical information, as well as to restrict the access to the historical information that is subjected to management. In the present invention, by storing the data that is received and stored in the data storage unit, and storing the information related to the image processing based on the data for which the execution instruction is received as the historical information in the history storage unit, it is possible to perform the management of each data together with various processing conditions in the image processing based on each data and information such as date and time of execution of said image processing, as the historical data. Therefore, since this enables to perform the management of number of paper sheets on which the image is formed, number of copies, density of formation, reduction ratio and enlargement ratio, and date and time of execution of the image processing performed on each data, together with the data subjected to processing, this information can be verified later. Moreover, if any data is misused, since the use of the data can be traced based on this information, the security is improved. Furthermore, by restricting the access to the history storage unit in which the historical information is stored, it is possible to prevent the unauthorized editing and deletion of the historical information that is subjected to the management.

In the image processing apparatus according to the present invention, the processing unit starts the image processing related to history information when the historical information is stored in the history storage unit. According to the present invention, upon the end of storing the historical information in the history storage unit, by starting the image processing of the historical information, the historical information can be stored assuredly before starting the image processing. Even if the image processing has been stopped half way, since the historical information is stored before starting the image processing, the historical information can be acquired assuredly.

The image processing apparatus according to the present invention includes an authenticating unit, and is structured such that when the processing unit confirms the authenticating unit to be right, the image processing is performed based on the data that is stored in the data storage unit according to the execution instruction that is received by the instruction receiving unit, and the historical information includes information related to authentication when the processing unit performs the image processing based on the data. According to the present invention, the image processing apparatus that performs image processing according to the execution information that is received only when the authentication is right, stores in the history storage unit the information related to the authentication that is required while performing the image processing by including in the historical information. This enables to perform the management of user information that has given the execution instruction for the image processing together with each data when the user information can be acquired by the information related to the authentication. Therefore, it is possible not only to keep track of the image processing that has been performed on each data but also to know the user who has given the execution instruction for each image processing. Moreover, for example, use of data by hacking without authentication can be detected.

The image processing apparatus according to the present invention includes a plurality of processing units that performs a plurality of types of image processing, a receiving unit that receives an instruction for whether or not the historical information for the image processing that is performed by each of the processing unit is to be stored, and a setting unit that sets whether or not the historical information related to each image processing is to be stored in the history storage unit according to the received instruction, and the history storage unit stores the historical information related to the image processing that is set when stored by the setting unit. According to the present invention, regarding the respective image processing of the plurality of types, an instruction for whether or not the historical information is to be stored in the history storage unit is received and according to the received instruction, the setting of whether or not the historical information related to each image processing is to be stored in the history storage unit is made, and only the historical information related to the image processing that is set to be stored is stored in the history storage unit. Therefore, it is possible to set the type of image processing in which the management of the historical information is performed by the history storage unit according to the instruction from the user. In the present invention, regarding the respective image processing of the plurality of types, since the setting of whether or not the historical information is to be stored in the history storage unit is made by the instruction from the user, the type of image processing in which the historical information is stored can be changed voluntarily by the user.

The image processing apparatus according to the present invention includes a judging unit that makes a judgment of whether or not predetermined information is included in the data that is stored in the data storage unit, and the history storage unit stores the historical information related to data that is judged be including the predetermined information. According to the present invention, by making the judgment of whether or not the predetermined information is included in the data that is received and stored in the data storage unit and by storing in the history storage unit the historical information related to the data in which the predetermined information is included, it is possible to perform the management only of the historical information that is related to the data that includes the historical information, as for image data that is read from a document to which a mark indicating that it is a confidential document is attached, for example. Therefore, based on each data that is received and stored in the data storage unit, the setting of whether or not the historical information is to be stored in the history storage unit can be done and an important document that is to be stored desirably as the historical information can be selected and the historical information can be stored.

The image processing apparatus according to the present invention includes an interrupting that interrupts storing the received data in the data storage section and the history storage unit stores the historical information related to the data that is stored in the data storage unit before the storing of data into the data storage unit is interrupted. According to the present invention, when the process of storing the received data into the data storage unit is interrupted, by storing in the history storage unit the historical information related to the data that is stored in the data storage unit until the storing is interrupted, even if the image processing based on the received data has not been executed, the management of data that is acquired up to half way is possible as the historical information. Therefore, it is possible to perform the management of the historical information related to the entire data for which an attempt to execute the image processing is made.

The image processing apparatus according to the present invention is equipped with a stop-authenticating unit that performs authentication for stopping the process of storing the historical information in the history storage unit, and a stopping unit that stops storing the historical information when the stop-authenticating unit has confirmed to be right. According to the present invention, by performing the authentication for stopping the process of storing the historical information into the history storage unit, and stopping the process of storing the historical information only when it is confirmed to be right, it is possible to inhibit the stopping of the process of storing the historical information by an unauthorized person and to prevent the inadvertent decline in security.

The image processing apparatus according to the present invention is equipped with an access authenticating unit that performs authentication for making an access to the history storage unit, and the restricting unit allows the access when the access authenticating unit has confirmed it to be right. According to the present invention, the authentication is performed when an access is made to the history storage unit that stores the historical information, and by allowing the access when it is authenticated, it is possible to inhibit handling of the historical information by an unauthorized person and to prevent the unauthorized editing and deletion of the historical information.

BRIEF DESCRIPTION OF THE SEVERAL VIEWS OF THE DRAWINGS

FIG. 2A is a schematic diagram of an example of a structure of a manager authentication screen;

FIG. 2B is a schematic diagram of an example of a structure of the manager operation screen;

FIG. 2C is a schematic diagram of an example of a structure of a management condition setting screen;

FIGS. 3A to 3D are schematic diagrams of an example of a structure of a historical data display screen;

FIGS. 4A to 4D are schematic diagrams of an example of a structure of a historical data deletion screen;

DETAILED DESCRIPTION OF THE INVENTION

Figure 1:
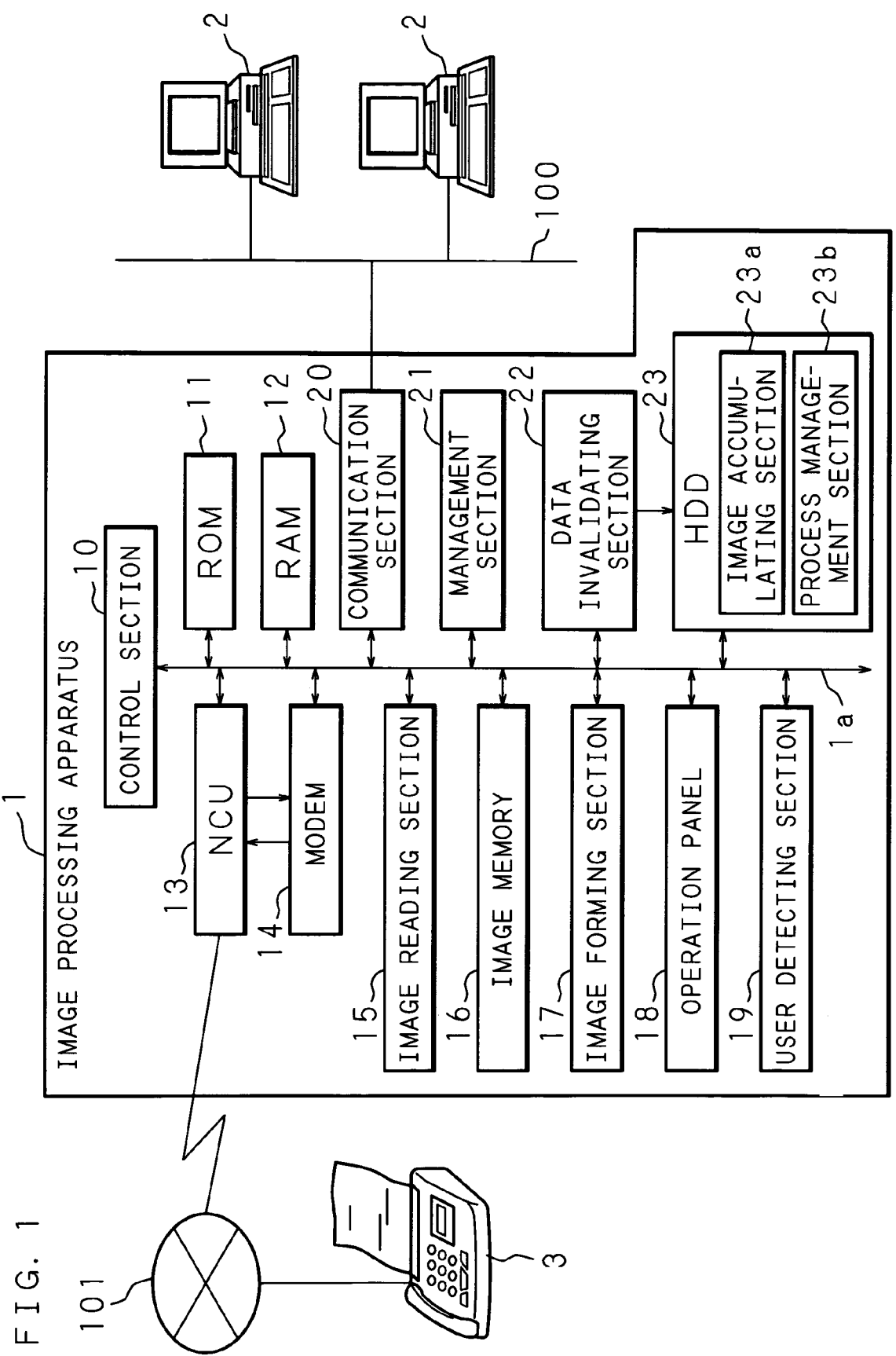
FIG. 1 is block diagram showing an example of an internal configuration of an image processing apparatus according to the present invention.

An image processing apparatus according to the present invention is described below concretely with reference to drawings showing its embodiments. FIG. 1 is a block diagram showing an example of an internal configuration of the image processing apparatus according to the present embodiment. An image processing apparatus 1 according to the present embodiment includes a control section 10, a ROM (Read Only Memory) 11, a RAM (Random Access Memory) 12, an NCU (Network Control Unit) 13, a modem 14, an image reading section 15, an image memory 16, an image forming section 17, an operation panel 18, a user detecting section 19, a communication section 20, a management section 21, a data invalidating section 22, and a hard disc device (hereinafter, "HDD") 23, and are connected to each other via a bus 1a.

The control section 10 includes an MPU (Micro Processor Unit) or a CPU (Central Processing Unit) that has a timer (not shown in the diagram), and controls each hardware section mentioned above that is connected via the bus 1a, reads and executes appropriately in the RAM 12 a control program that is stored in advance in the ROM 11. Various control program and authentication program and the like that are necessary for operating the image processing apparatus 1 as the image processing apparatus according the present invention are stored in advance in the ROM 11. The RAM 12 includes an SRAM or a flash memory and stores temporarily data that is generated during execution of the control program by the control section 10.

The modem 14 includes a facsimile modem that enables facsimile communication, and is connected directly to the NCU 13. The NCU 13 is connected to a public telephone line network 101 and connects the modem 14 to the public telephone line network 101 according to the requirement. The NCU 13 operates as a processing unit that performs facsimile-communication process with an external facsimile apparatus 3 via the public telephone line network 101.

The communication section 20, is an interface for connecting to a communication network 100 such as a LAN (Local Area Network) and receives printing jobs from computers 2 and 2 that are connected to the communication network 100, as well as transmits information that is to be notified to the computers 2 and 2. Therefore, the communication section 20 operates as a processing unit that transmits image data that is read by the image reading section 15 from a document, to the external computers 2 and 2.

The operation panel 18 includes an operating section that receives operation instructions from a user, and a display section that displays information to be notified to the user. The operating section is equipped with various operating buttons for receiving the operation instructions from the user and is an instruction receiving section that receives instructions such as set values in each function, for example, number of copies, copy density etc., switching operation of each function, and execution instruction for each process. The display section includes a liquid crystal display and displays information such as operating condition of the image processing apparatus 1, set values that are inputted by the operating section and information that is to be notified to the user.

The image reading section 15 is a scanner unit that includes an A/D converter and an image sensor in which a CCD (Charge Couple Device) and a light source that irradiates a document to be read are used. The image reading section 15 causes an image on a document that is set at a predetermined reading position to be formed on the image sensor, converts it into an analog electric signal, and then performs A/D conversion of the analog electric signal that is obtained. Then, the image reading section 15 creates image data in digital format for the digital signal that is obtained upon A/D conversion by applying correction to unevenness in sensitivity of the image sensor and light distributing characteristics of the light source when the document is read, and stores this image data in digital format in the image memory 16.

The image memory 16 is formed by a DRAM for example, and stores temporarily data such as the image data that is created upon reading the image on the document by the image reading section 15, image data that is received from the external facsimile apparatus 3 via the pubic telephone line network 101, and image data that is acquired by executing the printing job that is received from the external computers 2 and 2 via the communication network 100. The image data that is stored temporarily in the image memory 16 is transferred to the HDD 23 in units of pages and is accumulated in an image accumulating section 23a.

The image forming section 17 includes a charger that charges a photosensitive drum to a predetermined electric potential, a laser writing unit that creates an electrostatic latent image on the photosensitive drum by emitting laser beam according to the image data, a developing unit that visualizes the electrostatic latent image that is formed on a surface of the photosensitive drum by supplying toner, a transferring unit that transfers a toner image to a medium such as a paper sheet and an OHP film (none of these units is shown in the diagram), and operates as a processing unit that performs a process of forming on the paper sheet an image that the user desires to have by electrophotography. Moreover, the image forming section 17 is not restricted to a structure that forms the image by the electrophotography in which the laser writing unit is used, and may be any structure that allows forming the image by ink-jet method, thermal transferring, and sublimation.

The management section 21 includes a flash memory for example and stores information about hardware that forms the image processing apparatus 1 and information about internal status of the apparatus. The management section 21 is formed such that when the power supply is put ON the management section 21 acquires this information by communicating with each hardware, as well as monitors periodically the status of the hardware in operation and updates whenever necessary the contents of the information that is being managed.

Moreover, the management section 21 stores authentication information that is used for authentication process that is performed appropriately during the operation of the image processing apparatus 1. As the authentication information, an authentication number that includes a plurality of lines of numerals for example, is stored in advance in the management section 21 and when the authentication data is inputted from the operation panel 18, the control section 10 reads and executes in the RAM 12 an authentication process program that is stored in the ROM 11, thereby making a judgment of whether or not the authentication data that is input and the management information that is stored in advance in the management section 21 match. If they match, it operates as the authenticating unit that authenticates the user or the manager as an authorized person.

The HDD 23 is a large capacity storage unit and stores data such as the image data read from the document by the image reading section 15, the image data received from the external facsimile apparatus 3, and the image data that is acquired by executing the printing job received from the external computers 2 and 2. Each of the image data may be stored in the HDD 23 upon encoding. The HDD 23 has the image accumulating section 23a that is a data storage unit, which stores the data mentioned above for reuse and a process management section 23b that is a history storage unit, which stores the historical data (historical information) related to each image processing by the image processing apparatus 1.

When an image that is outputted once is required to be outputted once again due to a failure of output or shortage of number of output copies, or according to an instruction from the user or an instruction that is transmitted from the computers 2 and 2 and received at the communication section 20, the image data that is stored in the image accumulating section 23a can be read and used again according to the requirement. By doing so, the image processing apparatus 1 functions as a file server device for data. When the image data is stored in the image accumulating section 23a, the convenience due to the reuse of the image data is improved. However, when the image data is not stored in the image accumulating section 23a, since it is possible to prevent the leakage of the image data from the image accumulating section 23a, the security of the image processing apparatus 1 can be improved.

Therefore, the user and the manager of the image processing apparatus 1 may perform the setting of whether the image data is to be accumulated or not in the image accumulating section 23 according to the priority order of the improvement in the convenience and the improvement in the security of the image processing apparatus 1. The image data that is stored in the image accumulating section 23a is transferred to a destination of transfer according to an object of use. Concretely, when an image is to be formed on the paper sheet, the image data is transferred to the image forming section 17, when it is to be transmitted to the computers 2 and 2, the image data is transferred to the communication section 20, and when it is to be transferred to the facsimile apparatus, the image data is transferred to the modem 14.

On the other hand, when the image processing apparatus 1 receives the execution instruction for image processing from the user via the operation panel 18, process information related to the image processing that shows the execution instruction received and the image data that is to be processed in the image processing are stored in the process management section 23b. Concretely, when the image processing apparatus 1 receives an execution order for copy process from the user via the operation panel 18, a document placed on a predetermined document tray is read by the image reading section 15 and upon storing once in the image accumulating section 23a, process information related to the copy process that shows the execution instruction received and the image data that is stored in the image accumulating section 23a are stored in the process management section 23b as one historical data.

Moreover, when the image processing apparatus 1 receives an execution order for facsimile transmission process from the user via the operation panel 18 for example, the document placed on the predetermined document tray is read by the image reading section 15 and upon storing once in the image accumulating section 23a, process information related to the facsimile transmission that shows the execution instruction received and the image data that is stored in the image accumulating section 23a are stored in the process management section 23b.

The process information mentioned above includes information such as date and time of execution of image processing, information about an acquisition process when the image data is acquired, information about image processing when an image of the image data acquired is outputted on the paper sheet, and information about a transmission process when the image data acquired is transmitted to an external apparatus. More concretely, the information related to the acquisition process includes information such as an acquisition route of image data, and a facsimile number of a facsimile apparatus 3, or an IP address of the computers 2 and 2. The information about image processing includes information such as number of papers, number of copies, density, and reduction ratio or enlargement ratio, and the information about the transmission process includes information such as the facsimile number of the facsimile apparatus 3 at the destination of the image data or the IP address of the computers 2 and 2.

Moreover, if the user authentication when the user uses the image processing apparatus 1 is obligatory, user information that can be acquired when the authentication is performed is included as well in the process information and stored in the process management section 23b. In this case, since it is possible to know the user who has performed the image processing that is indicated by each historical data stored in the process management section 23b, if the image data is misused, the person who has misused can be traced assuredly.

The process management section 23b has each historical data reduced and stored in it for each file format of each image data, for each image processing such as copy, facsimile transmission, and printer output, or for each folder that is created by the user. Moreover, when the image processing apparatus 1 is in normal operation, the control section (restricting unit) 10 restricts an access to the process management section 23b.

Concretely, when there is an instruction for reading or deletion of the historical data that is stored in the process management section 23b, the control section 10 (access authenticating unit) does not perform the authentication, and only when the user is confirmed to be an authorized manager of the image processing apparatus 1, the reading or deletion of the historical data from the process management section 23b is allowed. When the reading of the historical data stored in the process management section 23b is allowed, i.e., when the image processing apparatus 1 is operated by the authorized manager, it can be verified by displaying the historical data on the display section of the computers 2 and 2 that are connected via the communication network 100 or the operation panel 18.

The data invalidating section 22 performs a data deletion function that invalidates in order that the image data stored in the HDD 23 cannot be used, by deleting the image data stored in the HDD 23, according to the instruction from the control section 10 or by overwriting the predetermined data. Even if the data in the HDD 23 is deleted, since the data can be restored because of the magnetism remained in the HDD 23, by overwriting the data randomly for a plurality of times, the setting can be done such that the restoring of data becomes impossible.

The user detecting section 19 is a sensor that detects an existence of a user who is near the image processing apparatus 1 and detects approaching of the user within a predetermined range of the image processing apparatus 1 and going out of the user from the predetermined range of the image processing apparatus 1.

According to the structure mentioned above, in the image processing apparatus 1, the image reading section 15 reads the document placed by the user on the predetermined document tray that is not shown in the diagram. The image processing apparatus 1 transmits the image data that is acquired upon reading, to the facsimile apparatus 3 that is connected to the public telephone line network 101 via the modem 14 and the NCU 13, and receives the image data that is transmitted by the facsimile communication from the external facsimile apparatus 3 via the public telephone line network 101. Thus, the image processing apparatus 1 functions as a facsimile apparatus.

The image processing apparatus 1, functions as well, as a copier where in the image forming section 17, the image based on the image data acquired is copied on a paper sheet. Moreover, the image processing apparatus 1 functions as a network scanner that transmits from the communication section 20 the image data read from the document by the image reading section 15 to the computers 2 and 2 that are connected to the communication network 100. Furthermore, the image processing apparatus 1 functions as a network printer that records, on the paper sheet at the image is forming section 17 the image based on the data received from the external device by the communication section 20 via the communication network 100.

Moreover, the image processing apparatus 1, as mentioned above, performs the image data management in which the image data to be processed and process information related to the image processing are stored in the process management section 23b, while performing the image processing of the image data that is stored in the image accumulating section 23a. In the present embodiment, the start and the end of the management of the historical data, and the checking and deletion of the historical data that is stored in the process management section 23b is let to be possible only when the confirmation upon authentication by the manager of the image processing apparatus 1 is positive.

The following is a description of the control section 10 when the manager of the image processing apparatus 1 performs the operation mentioned above, which the manager is allowed to perform. Since the manager performs only the operation that is allowed to him, when the manager operates a predetermined operating button on the operation panel 18, the control section 10 of the image processing apparatus 1 displays a manager authentication screen as shown in FIG. 2A on the operation panel 18. All screen information that is displayed on the operation panel 18 is stored in the ROM 11 in advance.

The manager, according to the manager authentication screen shown in FIG. 2A, inputs the authentication data that is assigned to the manager, by a numerical key pad and operates "authenticate" button. When the "authenticate" button is operated, the control section 10 makes a judgment of whether or not the authentication data that is inputted matches with authentication information for the manager's authentication that is stored in the management section 21. If it does not match, a fact that the person performed the operation was not authenticated as a manager is displayed on the operation panel 18 and is notified to the user.

On the other hand, if the person who has performed the operation is authenticated as a manager, a manager operation screen as shown in FIG. 2B is displayed on the operation panel 18. The manager operation screen is a screen for selecting operations that are allowed only to the manager viz. "start management of historical data", "end management of historical data", "check historical data" and "delete historical data", and the manager selects the desired operation.

In this case, if the manager selects "start management of historical data", the control section 10 displays a management condition setting screen shown in FIG. 2C on the operation panel 18. The management condition setting screen is a screen for setting whether or not to accumulate the corresponding historical data when the execution instruction for each process is received, in the process management section 23b of the HDD 23, and the manager selects a type of process for which the historical data is to be managed from among "copy", "Fax", and "printer", and operates "set" button. On the management condition setting screen, not only one from among the "copy", "Fax" and "printer", but two or all the processes can be selected, and a selection of whether or not the management of the historical data is to be performed for each process is made.

On the management condition setting screen shown in FIG. 2C, when the manager operates the "set" button, the control section (setting unit) 10 sets the process selected as a process to be subjected to the management of the historical data. By selecting this, the control section 10, when the execution instruction for the selected process is received, stores the image data that is read from the document to be processed or the image data that is received from an external apparatus to be processed, and the process information related to each process for which the received execution instruction is shown, as the historical data in the process management section 23b.

Concretely, when the execution instruction for copy process or facsimile transmission process is received from the user, the control section 10 of the image processing apparatus 1 upon storing the image data read from the document by the image reading section 15 in the image accumulating section 23a of the HDD 23, stores (copies) all the processing conditions for copy process or facsimile transmission process and information such as date and time shown by a timer of the control section 10 together as the historical data in the process management section 23b. Then, if the storing of the historical data ends, the control section 10 transfers the image data stored in the image accumulating section 23a according to the received execution instruction, to the image forming section 17 or the modem 14, and executes the image formation process on the paper sheet or the facsimile transmission process.

Moreover, when the image processing apparatus 1 performs the facsimile reception process or the image formation process based on the data received from the external computers 2 and 2, the control section 10 upon storing the image data received via the NCU 13 and the modem 14 or the communication section 20, in the image accumulating section 23a of the HDD 23, stores all the processing conditions for the facsimile reception process or for data reception process from the computers 2 and 2 and information such as date and time shown by the timer of the control section 10 together as the historical data in the process management section 23b. Then, if the storing of the historical data ends, the control section 10 transfers the image data stored in the image accumulating section 23a according to the received execution instruction, to the image forming section 17 and executes the image forming on the paper sheet.

Thus, as mentioned above, when the image processing apparatus 1 performs the image processing, apart from storing in the image accumulating section 23a of the HDD 23, it stores the image data of the process subjected to image processing and the process information related to the image processing in the process management section 23b, which enables to perform the management of the historical data in the image processing by the image processing apparatus 1. Moreover, accumulating the process information related to each process together with the image data of the process enables to keep track of as to when and for which process the image data has been used. Furthermore, storing the historical data in the image accumulating section 23a before performing the image processing, enables to perform the management of data that is fetched in the image processing apparatus 1 for executing the image processing, as the historical data.

On the other hand, when the manager selects "end management process of historical data" on the manager operation screen shown in FIG. 2B, the control section 10 ends the process of accumulating the historical data in the process management section 23b of the HDD 23 when the image processing apparatus 1 receives the execution instruction for each process. Even while ending the management process of the historical data, as shown in FIG. 2A, the control section 10 (stop authenticating unit) performs the manager authentication and if the manager is authenticated to be an authorized person, the management process of the historical data can be ended. This enables to prevent the inadvertent decline in security that might have caused due to the end of the management process of the historical data by an unauthorized person.

Moreover, when the manager selects "check management data" on the manager operation screen shown in FIG. 2B, the control section 10 displays the historical-data display screen as shown in FIG. 3A on the operation panel 18. In the present embodiment, when the desired historical data is selected from the historical data stored in the process management section 23b, an arrangement has been made to use the process information of each process that each historical data shows, and the historical data display screen shown in FIG. 3A is a screen for selecting either to display the process information in an order of date and time or to display in the order of date and time according to the type of the process.

When the manager selects "order of date and time" on this historical-data display screen, the control section 10 displays on the operation panel 18 a list of the process information corresponding to the entire historical data stored in the process management section 23b of the HDD 23, in the order of date and time. Moreover, when the manger selects "according to type of process", the control section 10 displays on the operation panel 18 a historical-data display screen shown in FIG. 3B and urges the manager to select the type of a process of which the process information is to be displayed.

When the manager selects the type of the process of which the process information is to be displayed, the control section 10 reads from the process management section 23b the process information corresponding to the process of the type selected and it displays on the operation panel 18 in the order of date and time. For example, when the manager selects "Fax", the control section 10 displays on the operation panel 18 the process information that indicates the historical data in the facsimile transmission process and the facsimile reception process, as shown in FIG. 3C.

The manager specifies the process information that indicates the historical data that is to be checked by displaying on the operation panel 18, selects the process information that is specified and operates an OK button. When the manager operates the OK button, the control section 10 reads from the process management section 23b of the HDD 23 the historical data corresponding to the process information selected, and displays it on the operation panel 18. Thus, even while displaying the historical data that is stored in the process management section 23b, by performing the manager authentication according to the manager authentication screen shown in FIG. 2A, reading of the historical data by an unauthorized person can be inhibited.

Image data and process information in the historical data that is read and a "print" button for the image output on a paper sheet of the displayed historical data are displayed on a historical-data display screen shown in FIG. 3D. When the historical data that is displayed is to be outputted, the manager operates the "print" button, and when the "print" button is operated, the control section 10 transfers the historical data that is read from the process management section 23b, to the image forming section 17.

Furthermore, when the manager selects "delete historical data" on the manager operation screen shown in FIG. 2B, the control section 10 displays a historical-data deletion screen as shown in FIG. 4A on the operation panel 18. The historical-data deletion screen is a screen for selecting a deletion method from among "deletion of entire historical data", "deletion according to type of process", and "deletion according to date and time".

In this case, when the manager selects "deletion of entire historical data", the control section 10 displays a check screen as shown in FIG. 4B on the operation panel 18, and further when the manager operates a "delete" button, the entire historical data that is stored in the process management section 23b of the HDD 23 is deleted by the data invalidating section 22. The historical data stored in the process management section 23b may be let to be invalidated by overwriting predetermined data by the data invalidating section 22 apart from being deleted by the data invalidating section 22.

Moreover, when the manager selects "deletion according to type of process", the control section 10 displays on the operation panel 18 a screen to select a type of process for deleting the historical data from the process management section 23b. When the manager selects the type of process of which the historical data is to be deleted, and operates the "delete" button, the control section 10 causes the data invalidating section 22 to delete the historical data corresponding to the process that is selected from the historical data that is stored in the process management section 23b of the HDD 23.

Furthermore, when the manager selects "deletion according to date and time", the control section 10 displays on the operation panel 18 a screen for inputting date and time in the historical data that is to be deleted from the process management section 23b, as shown in FIG. 4D. When the manager operates the "delete" button upon inputting the desired date and time by the numerical keypad, the control section 10 causes the data invalidating section 22 to delete the historical data corresponding to a range of the date and time that is inputted, from the historical data that is stored in the process management section 23b of the HDD 23. On the historical-data deletion screen shown in FIG. 4D, an arrangement is made to designate the historical data to be deleted according to date. However, an arrangement may be made to designate the historical data according to date and time.

Thus, even in a case of deleting the historical data stored in the process management section 23b, the historical data can be deleted only by an authorized manager that is confirmed by the manager authentication according to the manager authentication screen shown in FIG. 2A. Therefore, it is possible to inhibit the deletion of the historical data by an unauthorized person and to perform assuredly the management of the historical data of the image processing performed by the image processing apparatus 1, as well as to use efficiently the process management section 23b to enable the deletion of the unnecessary historical data by the manager.

Moreover, when the user information as well is included in the process information in the historical data stored in the process management section 23b, as mentioned above, the historical data is deleted not only according to the type of the process and the date and time, but can be deleted according to the user, thereby enabling to select and delete the historical data related to a process that is performed by the user who is not using the image processing apparatus 1 any more due to transfer etc.

Figure 5A:
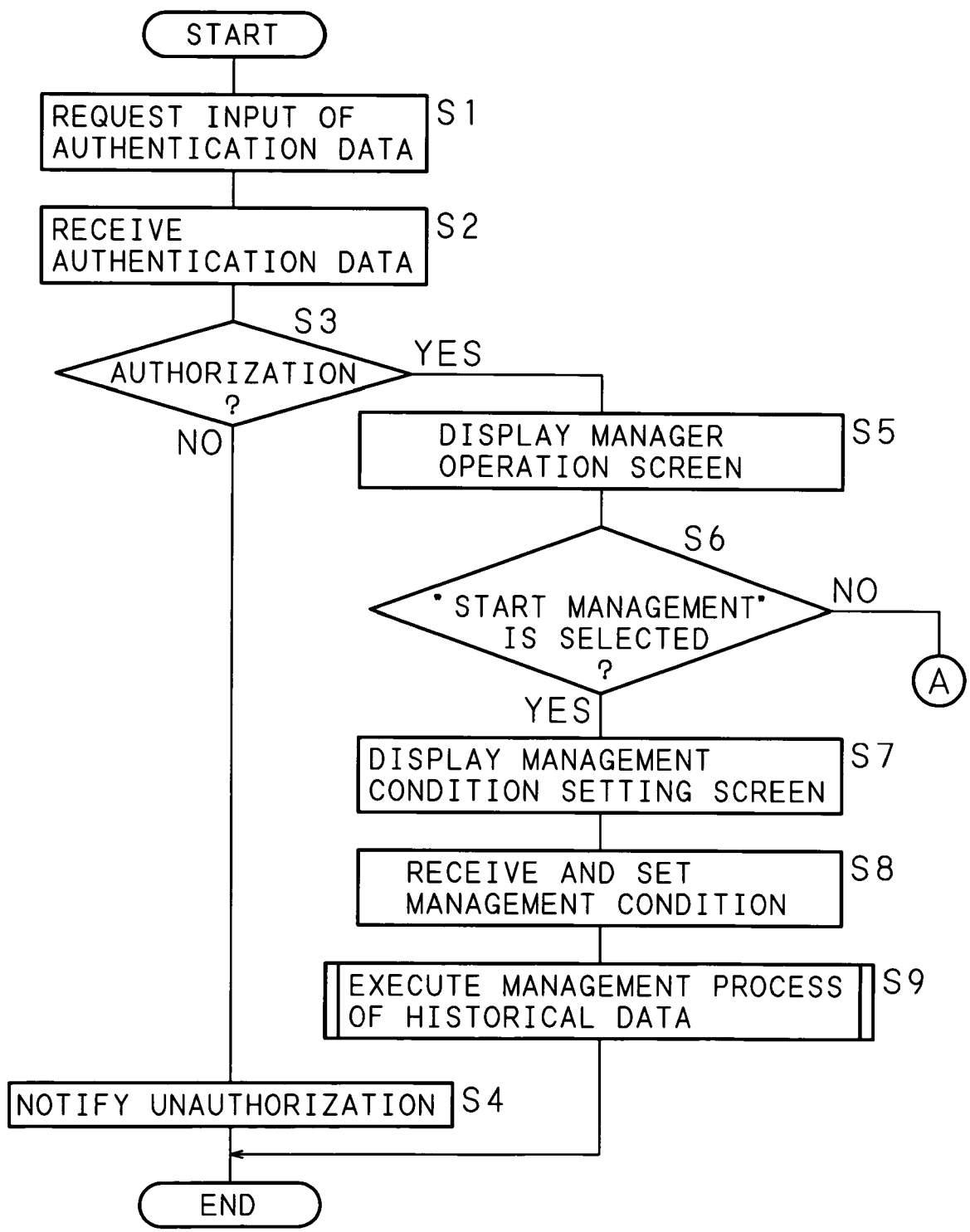
FIGS. 5A and 5B are a flow chart showing a procedure for processing by the image processing apparatus according to the present invention.
Figure 5B:
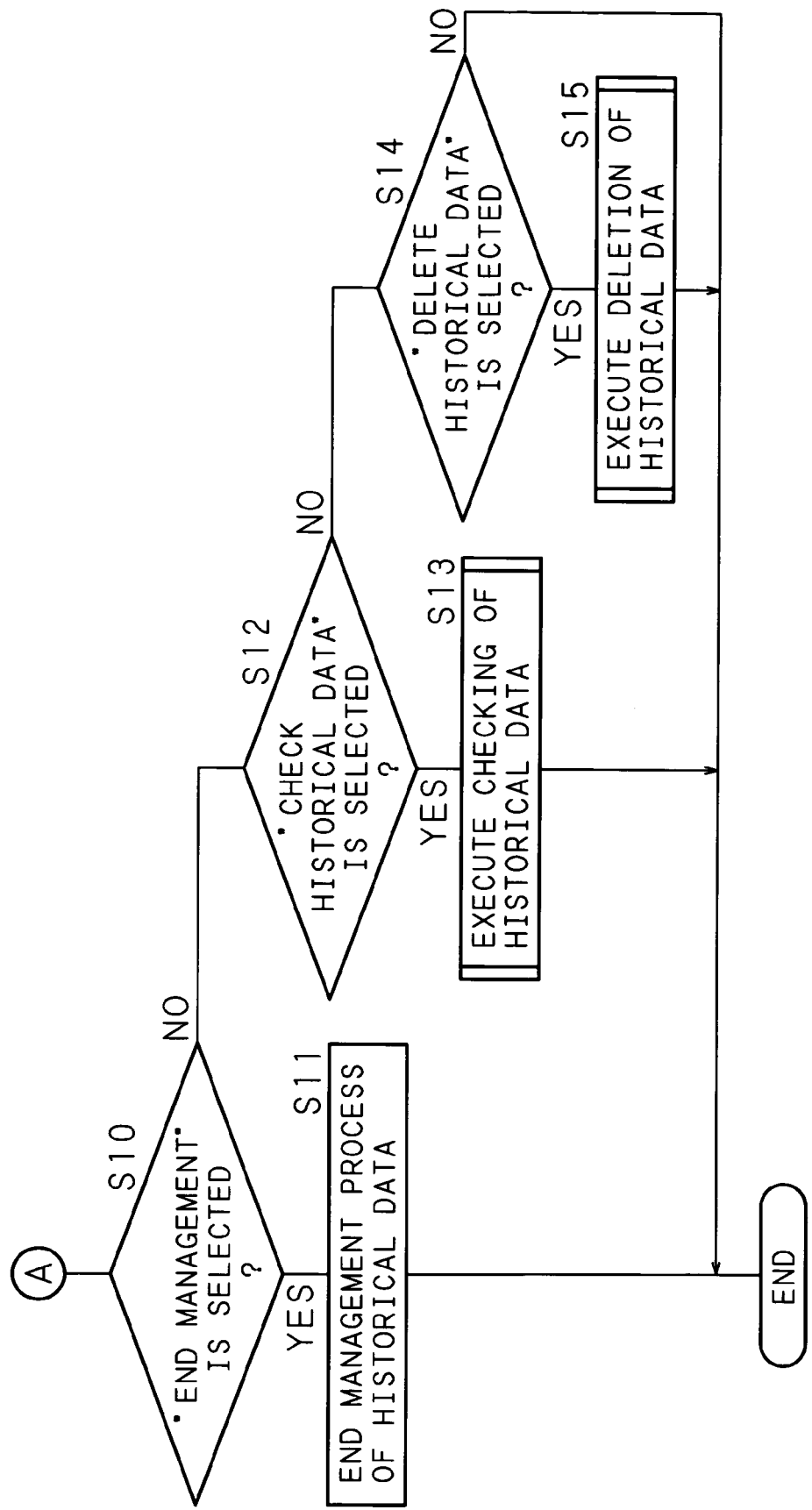

The following is a description of a processing by the image processing apparatus 1 when a specific manager only who is authorized, performs operations. FIGS. 5A and 5B are a flow chart showing a procedure for processing by the image processing apparatus 1 according to the present invention. The control section 10 executes the following process by a computer program that is stored in the ROM 11.

In the image processing apparatus 1 in normal operation, when the manager operates a predetermined operating button on the operation panel 18 to perform an operation that is allowed to be performed by the manager only, the control section 10 displays the manager authentication screen shown in FIG. 2A and makes a request for an input of authentication data (step S1). The manager inputs the authentication data by the numerical keypad on the operation panel 18 according to the manager authentication screen and operates the "authenticate" button. By this, the control section 10 receives the inputted authentication data (step S2) and makes a judgment of whether the manager is an authorized person based on whether or not the authentication data received matches with the authentication information for the manager authentication that is stored in advance in the management section 21 (step S3).

If the control section 10 judges the manager to be an unauthorized person (NO at step S3), it displays the fact on the operation panel 18 that the manager could not be authenticated and notifies it to the user (step S4). If the control section 10 judges the manager to be an authorized person (YES at step S3), it displays the manager operation screen shown in FIG. 2B (step S5), and receives a selection of a process that the manager wishes to execute.

The control section 10 makes a judgment of whether or not the manager has selected "start management of historical data" on the manager operation screen (step S6), and if it is judged that "start management of historical data" has been selected (YES at step S6), it displays the management condition setting screen shown in FIG. 2C (step S7). The manager selects the type of the process desired according to the management condition setting screen and operates the "set" button. Due to this, the control section 10 receives the selected management condition and carries out setting so that the management of the historical data for the process that is shown by the process condition, is performed (step S8), and executes the management process of the historical data according to the setting condition (step S9). The management process of the historical data is described later with reference to FIG. 6.

On the other hand, if it is judged that "start management of historical data" has not been selected (NO at step S6), the control section 10 makes a judgment of whether or not "end management process of historical data" has been selected by the manager (step S10). If the control section 10 makes a judgment that "end management of historical data" has been selected (YES at step S10), it ends the management process of the historical data (step S11).

Moreover, if the control section 10 makes a judgment that "end management process of historical data" has not been selected (NO at step S10), it makes a judgment of whether or not "check historical data" has been selected by the manager (step S12). If it is judged that "check historical data" has been selected (YES at step S12), the control section 10 executes checking of the historical data (step S13). The checking process of the historical data is described later with reference to FIG. 7.

Furthermore, if it is judged that "check historical data" has not been selected (NO at step S12), the control section 10 makes a judgment of whether or not "delete historical data" has been selected by the manager (step S14). If it is judged that "delete historical data" has been selected (YES at step S14), the control section 10 executes the deletion of the historical data (step S15). The deletion process of the historical data is described later with reference to FIGS. 8A and 8B.

If it is judged that "delete historical data" has not been selected (NO at step S14), when the "end" button on the manager operation panel shown in FIG. 2B has been operated, the control section 10 ends the process mentioned above. Thus, while performing the operation that is allowed to the manager only, by performing the manager authentication first of all by the manager, it is possible to prevent unauthorized editing and unauthorized operation of the historical data by a person other than the authorized manager.

Figure 6:
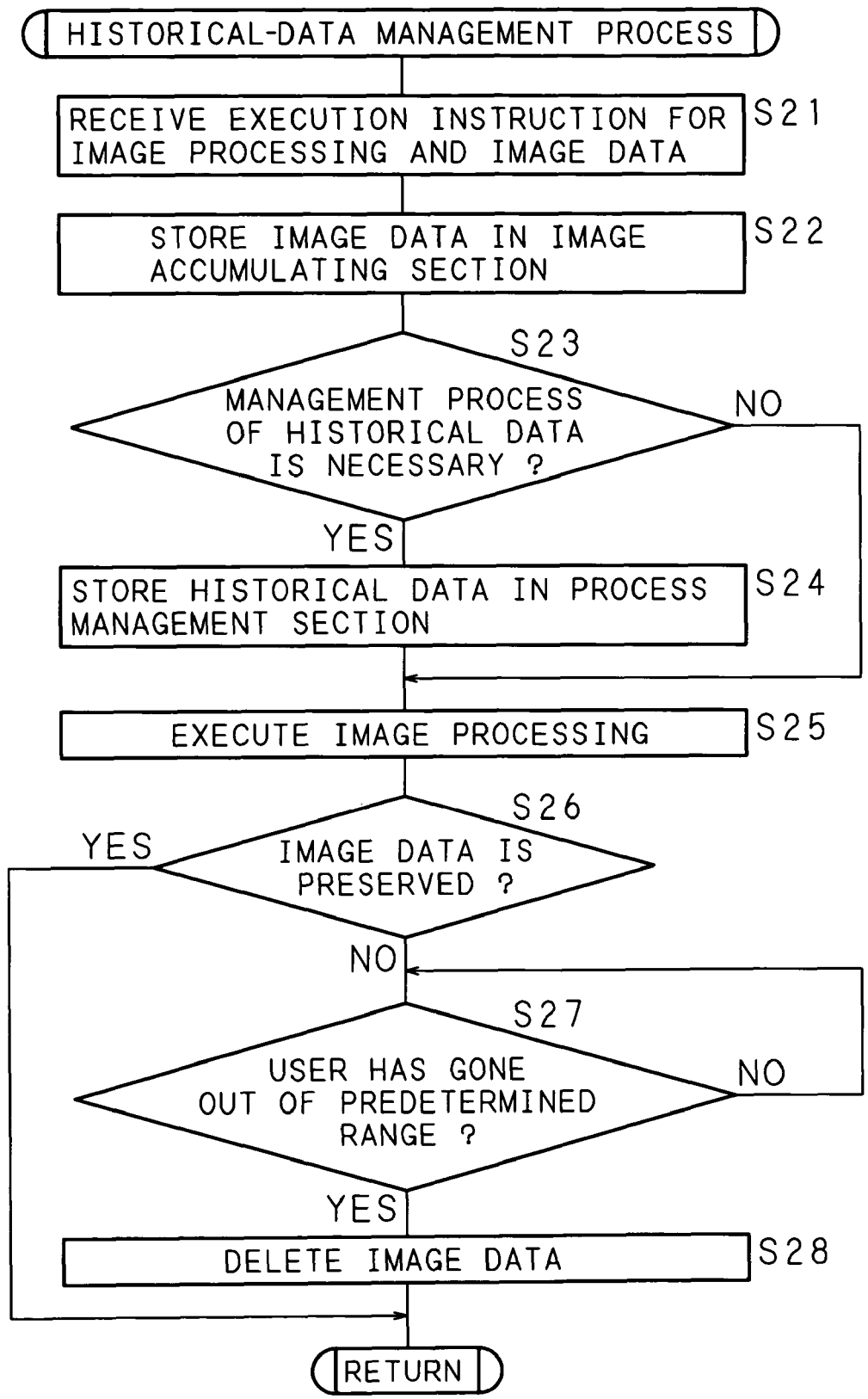
FIG. 6 is a flow chart showing a procedure for a management process of the historical data.

The following is a description of an operation by the image processing apparatus 1, when the start of the management process of the historical data is set by the manager as mentioned above. FIG. 6 is a flow chart showing a procedure for the historical-data management process by the image processing apparatus 1 according to the present invention. The control section 10 executes the following process according to a computer program that is stored in the ROM 11.

In the image processing apparatus 1 in the normal operation, if the execution instruction for copy process or facsimile transmission process is received by the operation of the operation panel 18 by the user, when the NCU 13 or the modem 14 has received facsimile data or when the communication section 20 has received the printing job, the control section 10 receives the image data to be processed, together with the execution instruction for the image processing of each type (step S21). The control section 10 stores the received image data in the image accumulating section 23a of the HDD 23 (step S22). Concretely, the received image data includes the image data that is read from the document by the image reading section 15, the image data that is acquired by executing the facsimile data that is received via the modem 14 or the image data that is acquired by executing the printing job that is received via the communication section 20.

At this stage, the control section 10 makes a judgment of whether or not it is necessary to perform the management process of the historical data related to the image data that is stored in the image accumulating section 23*a* at step S22, based on whether or not the setting has been made to perform the management of the historical data for the image processing for which the execution instruction is received at step S21 (step S23). If it is judged that it is necessary to perform the management of the historical data (YES at step S23), the control section 10 stores the image data that is stored in the image accumulating section 23 and the process information related to the image processing for which the execution instruction has been received at step S21, as the historical data in the process management section 23*b* (step S24). If it is judged that it is not necessary to perform the management of the historical data (NO at step S23), the control section 10 shifts the procedure to step S25.

After this, the control section 10 executes the image processing on the image data stored in the image accumulating section 23*a* according to the execution instruction received at step S21 (step S25). Concretely, when there is an instruction for the image output process on the paper sheet, the control section 10 transfers the image data stored in the image accumulating section 23*a* to the image forming section 17, when there is an instruction for the facsimile transmission process, the control section 10 transfers the image data stored in the image accumulating section 23*a* to the modem 14, and when there is an instruction for a network transmission process, the control section 10 transfers the image data stored in the image accumulating section 23*a* to the communication section 20.

Next, the control section 10 makes a judgment of whether or not the image data subjected to the image processing at step S25 is to be preserved in the image accumulating section 23*a* of the HDD 23 (step S26). If a judgment that the image data is to be preserved in the image accumulating section 23*a* is made (YES at step S26), the control section 10 ends the procedure. Moreover, if a judgment that the image data is not to be preserved in the image accumulating section 23*a* is made (NO at step S26), the control section 10 causes the user detecting section 19 to make a judgment of whether or not the user has gone out of a predetermined range from the image processing apparatus 1 (step S27) and waits till the user goes out of the predetermined range (NO at step S27). If a judgment that the user has gone out of the predetermined range from the image processing apparatus 1 is made (YES at step S27), the control section 10 causes the data invalidating section 22 to delete the image data stored in the image accumulating section 23*a* at step S22 (step S28) and the procedure returns.

Thus, when the image processing apparatus 1 receives the execution instruction for the copy process, facsimile communication process, and network communication process, by storing the image data to be processed together with the process information related to each process in the process management section 23*b* of the HDD 23, it is possible to keep track of as to when, and for which process the image data has been used. Moreover, in the image processing apparatus 1, if the user authentication for use by each user is made obligatory, since the management of the process information together with the user information for the data processed can be performed, it is possible to prevent misuse of the image data. Moreover, for the image data that has been misused, it is possible to trace as to when and who has used the image data for which process.

Furthermore, apart from the management process by storing the image data processed by the image processing apparatus 1 in the process management section 23*b*, by accumulating said image data processed by the image processing apparatus 1 in the image accumulating section 23*a*, it is possible to perform the management of the process history of the entire image data as well as to use the image processing apparatus 1 as a file server device.

If the image processing apparatus 1 is not used as the file server device, after the end of the processing by the image processing apparatus 1, by deleting the image data from the image accumulating section 23*a* by the data invalidating section 22, the image data is not let to remain advertently in the image accumulating section 23*a*. Only when the user is detected to have gone away from the predetermined range of the image processing apparatus 1, by the user detecting section 19, by deleting the image data from the image accumulating section 23*a*, waiting time of the user can be shortened based on the deletion of the image data in each copy process, that is executed in particular while the user performs different copy processes continuously.

Figure 7:
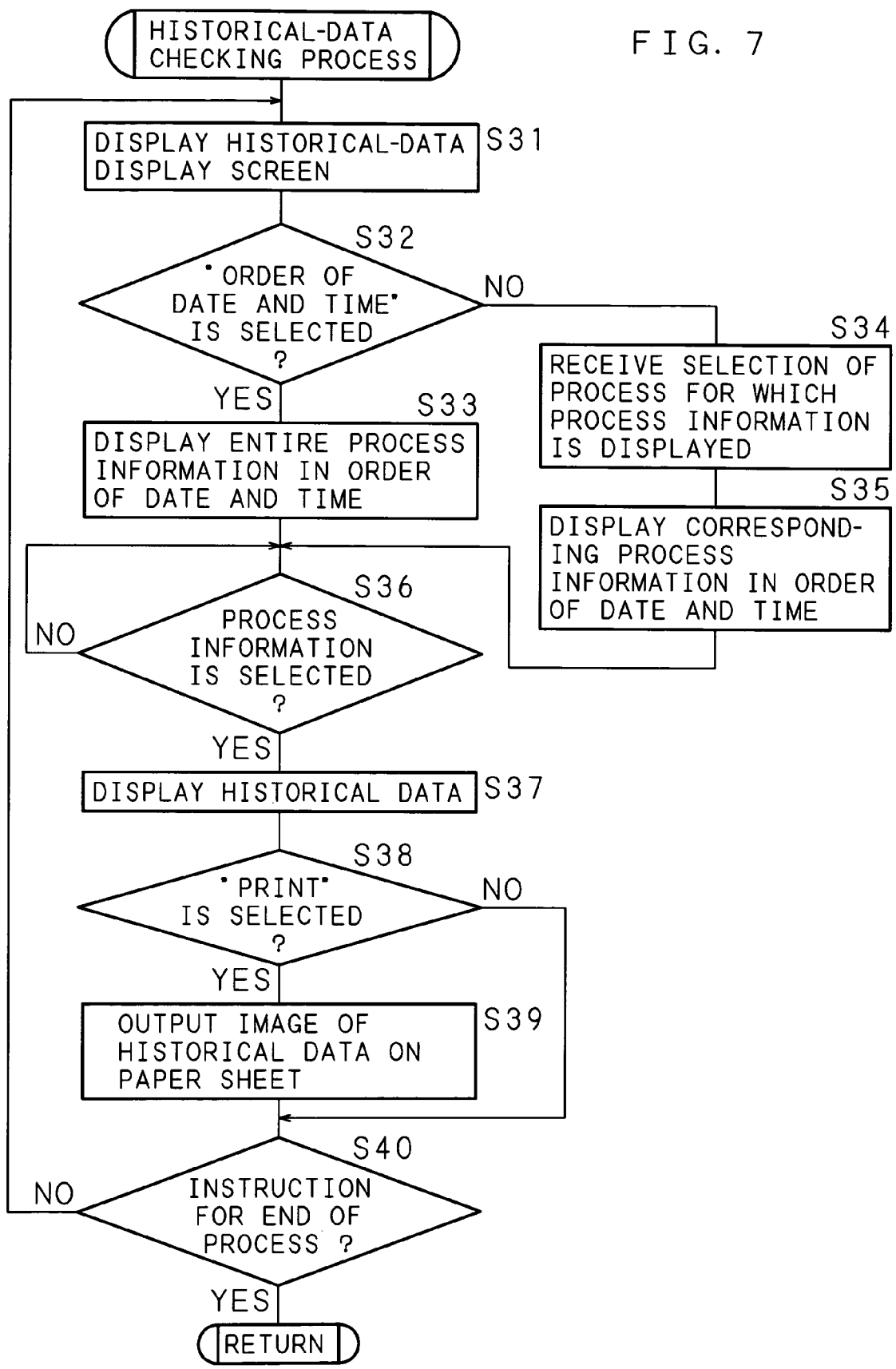
FIG. 7 is a flow chart showing a procedure for a checking process of the historical data.

The following is a description of checking by the manager of the historical data stored in the process management section 23*b* of the HDD 23 (step S13 in FIG. 5B). FIG. 7 is a flow chart of a procedure for a historical-data checking process by the image processing apparatus 1 according to the present invention. The control section 10 executes the following process by a computer program that is stored in the ROM 11.

As mentioned above, in FIG. 5, when the control section 10 makes a judgment that the manager has selected "check historical data", it displays the historical-data display screen shown in FIG. 3A (step S31) and receives a selection of a method of display of the process information corresponding to the historical data.

The control section 10 makes a judgment of whether or not the manager has selected a display in "order of date and time" on the historical-data display screen (step S32), and if the control section 10 makes a judgment that the display in "order of date and time" has been selected (YES at step S32), it displays in the order of date and time the process information corresponding to the entire historical data respectively that is stored in the process management section 23*b* of the HDD 23 (step S33). On the other hand, if the control section 10 makes a judgment that the display in "order of date and time" has not been selected (NO at step S32), i.e. if a display in "according to type of process" has been selected, it displays the historical-data display screen shown in FIG. 3B and receives the selection of a process for which the process information is to be displayed (step S34).

When the process selected by the manager is received, the control section 10, as shown in FIG. 3C, reads from the process management section 23*b* the process information corresponding to the process received and displays in the order of date and time (step S35). The control section 10 makes a judgment of whether or not the process information has been selected by selection of the desired process information by the manager from the list of process information, and operating the OK button (step S36), and if a judgment is made that the process information has not been selected (NO at step S36), it waits till the process information is selected.

When a judgment that the process information has been selected according to the list of the process information (YES at step S36), the control section 10 reads from the process management section 23*b* of the HDD 23 the historical data corresponding to the process information selected and displays it as shown in FIG. 3D (step S37). Next, the control section 10 makes a judgment of whether or not the "print"

button has been selected by the manager to output an image of the historical data that is displayed. If a judgment that the "print" button has been selected is made (YES at step S38), the control section 10 transfers to the image forming section 17 the displayed historical data and outputs the image on a paper sheet. If a judgment that the "print" button has not been selected is made (NO at step S38), the control section 10 skips the operation at step 39.

In cases such as when the "end" button on the historical-data display screen shown in FIG. 3D is operated, or when a power supply button (not shown in the diagram) of the image processing apparatus 1 is operated by the manager, the control section 10 makes a judgment of whether or not there has been an instruction for the end of the process (step S40). If a judgment that there has been no instruction for the end of the process (NO at step S40) is made, the procedure returns to step S31 and the procedure mentioned above is repeated. Moreover, if a judgment that there has been an instruction for the end of the process (YES at step S40), the control section 10 ends the procedure mentioned above and returns.

Thus, it is possible to display and check the historical data stored in the process management section 23b of the HDD 23 on the operation panel 18 by the operations performed by the manager. This enables the manager to verify as to when and for which process the image data has been used and the contents of process of the image data that has been misused by using the image processing apparatus 1 can be traced later.

Figure 8A:
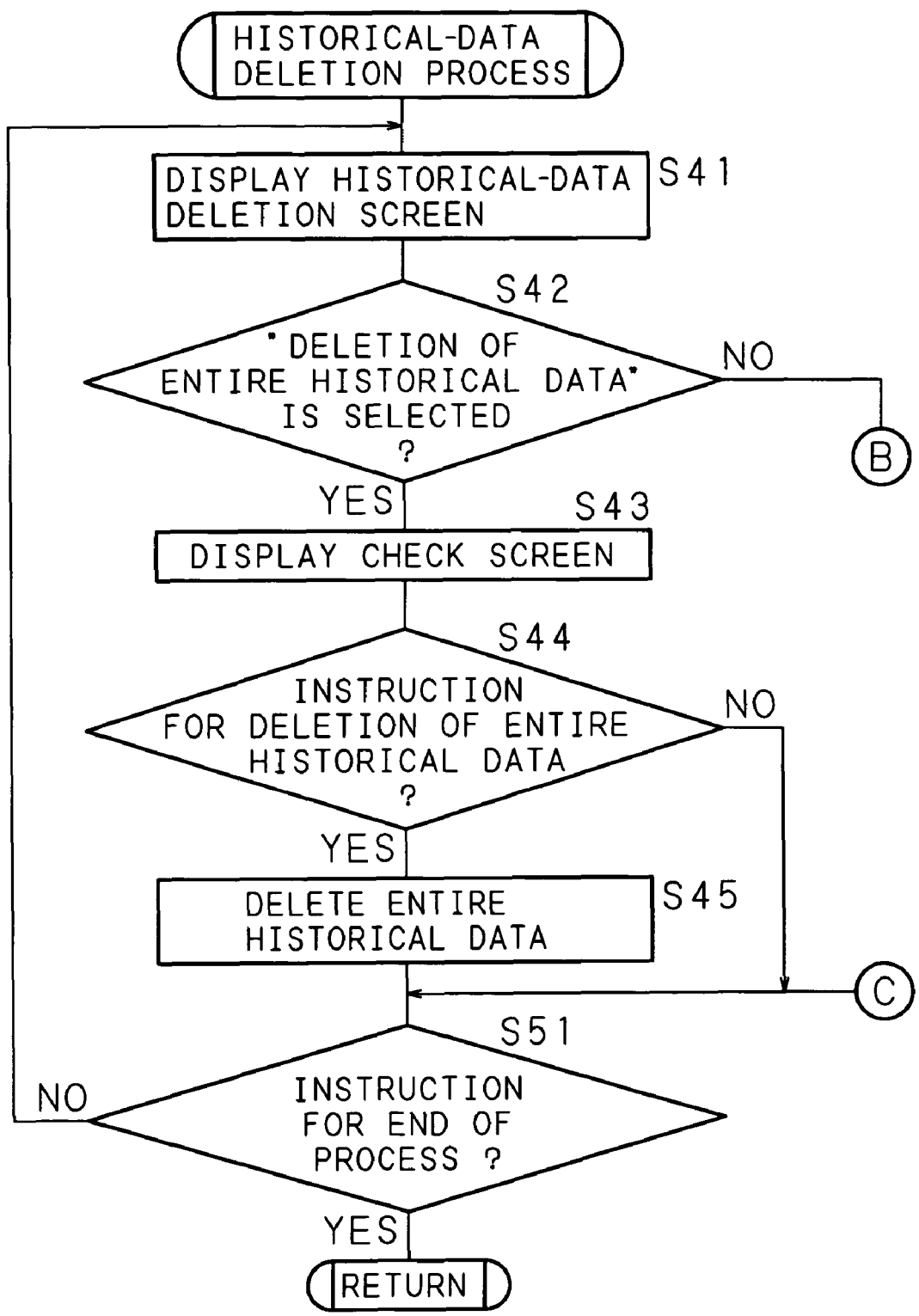
FIGS. 8A and 8B are a flow chart showing a procedure for a deletion process of the historical data.
Figure 8B:
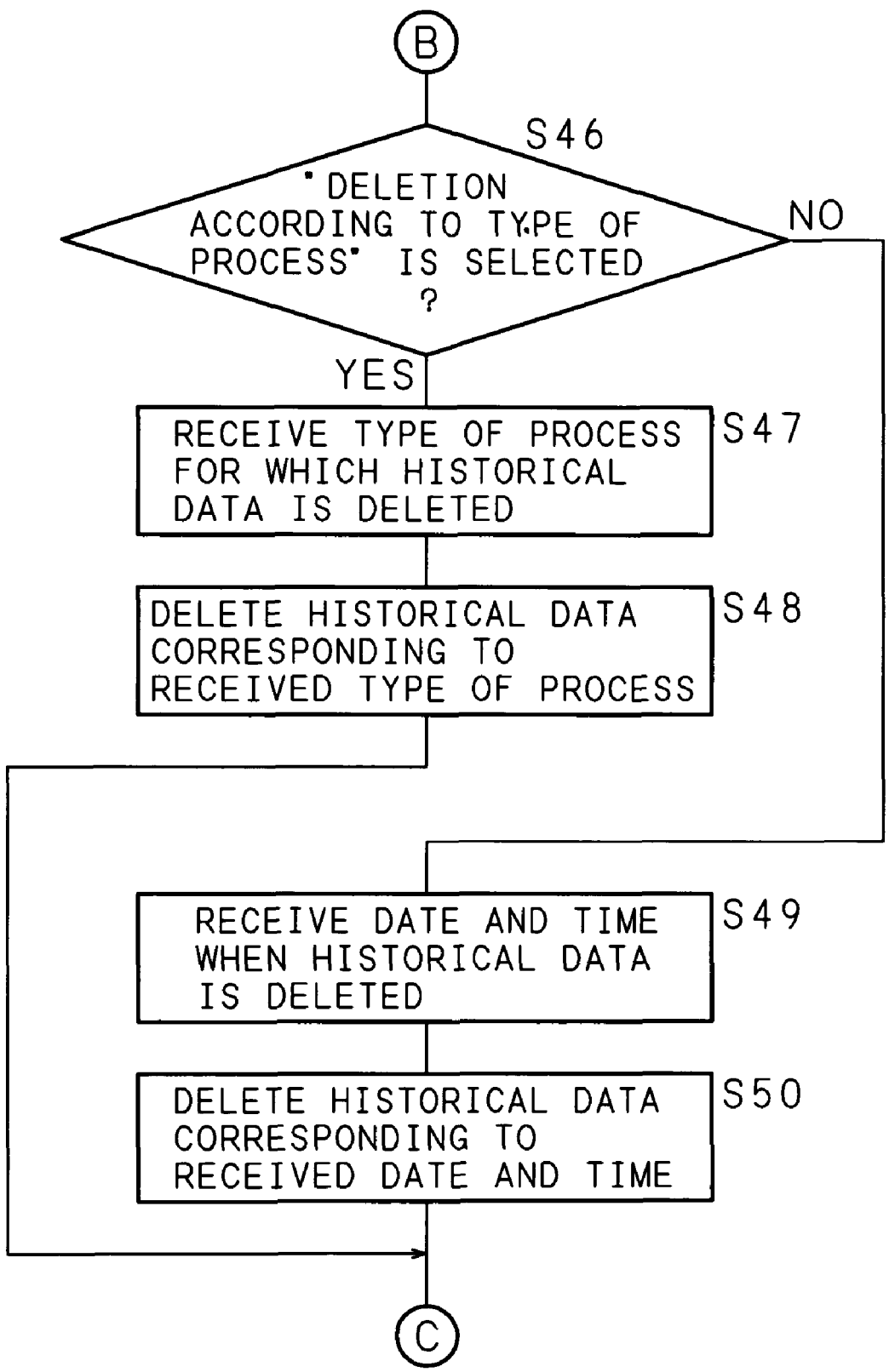

The following is a description of the process of deleting the historical data stored in the process management section 23b of the HDD 23, by the manager (step S15 in FIG. 5B). FIGS. 8A and 8B are a flow chart showing a procedure for deletion process of the historical data by the image processing apparatus 1 according to the present invention. The control section 10 executes the following process by a computer program that is stored in the ROM 11.

As mentioned above, when the control section 10 makes a judgment that "delete historical data" has been selected by the manager in FIG. 5B (YES at step S14), it displays the historical-data deletion screen shown in FIG. 4A (step S41), and receives a selection of a method for deleting the historical data.

The control section 10 makes a judgment of whether or not the manager has selected "deletion of entire historical data" on the historical-data deletion screen (step S42) and if "deletion of entire historical data" has been selected (YES at step S42), it displays the check screen shown in FIG. 4B (step S43). The control section 10 makes a judgment of whether or not an instruction for the deletion of the entire historical data has been given by operating the "delete" button on the check screen (step S44). If the control section 10 makes a judgment that the instruction for the deletion of the entire historical data has been given (YES at step S44), it causes data invalidating section 22 to delete the entire data stored in the process management section 23b of the HDD 23 (step S45). If the control section 10 makes a judgment that the instruction for the deletion of the entire historical data has not been given, (NO at step S44), when the "end" button on the check screen shown in FIG. 4B is operated for example, the procedure is shifted to step S51.

On the other hand, if the control section 10 makes a judgment that "deletion of entire historical data" has not been selected (NO at step S42), it makes a judgment of whether or not the manager has selected "deletion according to type of process" (step S46). If a judgment that "deletion according to type of process" has been selected is made (YES at step S46), the control section 10 displays the historical-data deletion screen shown in FIG. 4C and receives a type of the process for which historical data is to be deleted (step S47). When the type of the process for which the historical data is to be deleted has been selected and the "delete" button is operated by manager, the control section 10 causes the data invalidating section 22 to delete the historical data corresponding to the type of the process received from the historical data stored in the process management section 23b of the HDD 23 (step S48).

Furthermore, the control section 10 makes a judgment that "deletion according to type of process" has not been selected (NO at step S46), i.e. when "deletion according to date and time" has been selected, it displays the historical-data deletion screen shown in FIG. 4D and receives a date and time that specifies the historical data to be deleted (step S49). When the date and time that specifies the historical data to be deleted is inputted and the "delete" button is operated, the control section 10 causes the data invalidating section 22 to delete the historical data corresponding to a range of the date and time that is received from the historical data stored in the process management section 23b of the HDD 23 (step S50).

In case such as when the "end" button on each of the historical-data deletion screens shown in FIGS. 4A to 4D is operated or when the power supply button of the image processing apparatus 1 is operated by the manager, the control section 10 makes a judgment of whether or not there has been an instruction for the end of the process (step S51). If a judgment that there has been no instruction for the end of the process (NO at step S51) is made, the procedure returns to step S41 and the procedure mentioned above is repeated. Moreover, if a judgment that there has been an instruction for the end of the process (YES at step S51), the control section 10 ends the procedure mentioned above and returns.

Thus, by making an arrangement such that the historical data stored in the process management section 23b of the HDD 23 is deleted from the process management section 23b only by an appropriate operation by the manager, it is possible to perform assuredly the management of the image data processed by using the image processing apparatus 1, as the historical data in the process management section 23b, as well as to enable the manager to delete the unnecessary historical data, thereby enabling to use the HDD 23 efficiently.

In the image processing apparatus 1 mentioned above, an arrangement for acquiring the image data by the reading process of the image on the document by the image reading section 15 and the receiving process of the image data via the modem 14 or the communication section 20 has been described. However, when the image processing apparatus 1 includes a mechanism for reading a recording medium in the form of a card such as an IC card or a memory card, the arrangement may be such that the image data read from the recording medium in the form of a card is acquired.

Moreover, according to the embodiment mentioned above, an arrangement in which the authentication of data while performing the manager authentication and the user authentication is performed by the operation on the operation panel 18, has been described. However, an arrangement may be made such that a reading unit that can read an RFID (Radio Frequency Identification) card for example, by a non-contact method, is provided and the authentication data stored in the RFID card is read by the reading unit.

Furthermore, according to the embodiment mentioned above, an arrangement in which the image data that is to be subjected to the copy process, the facsimile communication process, or the network communication process, is stored as the historical data in the process management section 23b of the HDD 23 has been described. However, an arrangement may be made such that when predetermined information is included in the image data read from the document and in the image data received from an external apparatus, the historical data to be processed is stored in the process management section 23*b*. In this case, it is possible to select only the image data that is read from the document to which a mark indicating that it is an important document such as "internal use only" is attached, and store in the process management section 23*b*.

Moreover, the operation panel 18 includes an all clear button or a clear button, and an arrangement can be made such that even in a case where the acquisition of data is interrupted such as a case where the all clear button or the clear button is operated during the document reading process by the image reading section 15, or a case where the all clear button or the clear button is operated during the reception of the image data from outside, the image data that is acquired until the interruption of acquisition is stored as the historical data in the process management section 23*b*. In this case, even if the image processing is not ended, the management of the historical data related to the entire data for which an attempt is made to execute the image processing in the image processing apparatus 1, can be performed.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image processing apparatus comprising:
   a data storage unit that stores data that is received;
   an instruction receiving unit that receives an execution instruction for image processing based on the stored data;
   a plurality of processing units that perform a plurality of types of image processing respectively based on the data that is stored in said data storage unit in accordance with the execution instruction received by said instruction receiving unit;
   a setting unit that selectively sets whether or not historical information for each image processing performed by said image processing units respectively is to be stored in a history storage unit in accordance with the received execution instruction;
   the history storage unit that stores the data that is stored in said data storage unit and information related to the image processing based on the data for which said instruction receiving unit has received the execution instruction, as the historical information, only when the setting unit sets that the historical information is to be stored in the history storage unit; and
   a restricting unit that restricts an access to said history storage unit,
   wherein said processing units respectively start image processing for each process related to the historical information only after the historical information pertaining to each respective process is stored in said history storage unit.

2. The image processing apparatus according to claim 1, further comprising:
   an authenticating unit;
   wherein when said authenticating unit authenticates as authorized, said processing unit performs image processing based on said data that is stored in said data storage unit in accordance with an execution instruction received by said instruction receiving unit, and
   said historical information includes information related to authentication when said processing unit performs image processing based on the data.

3. The image processing apparatus according to claim 1, further comprising:
   a judging unit that makes a judgment of whether or not predetermined information is included in said data that is stored in said data storage unit, wherein
   said history storage unit stores historical information related to data, for which a judgment of predetermined information is included, is made.

4. The image processing apparatus according to claim 1, further comprising:
   an interrupting unit that interrupts storing received data in said data storage unit, wherein
   said history storage unit stores historical information related to data that is stored in said data storage unit before storing of data into said data storage unit is interrupted.

5. The image processing apparatus according to claim 1, further comprising:
   a stop-authenticating unit that performs authentication for stopping a process of storing historical information into said history storage unit; and
   a stopping unit that stops the process of storing the historical information when said stop-authenticating unit has authenticated as authorized.

6. The image processing apparatus according to claim 1, further comprising:
   an access authenticating unit that performs authentication for making an access to said history storage unit; wherein
   said restricting unit allows the access when said access authenticating unit authenticates as authorized.

\* \* \* \* \*